US008978828B2

(12) United States Patent
Eisenbacher et al.

(10) Patent No.: US 8,978,828 B2
(45) Date of Patent: Mar. 17, 2015

(54) METHOD FOR METERED DISPENSING OF LUBRICANT

(75) Inventors: Egon Eisenbacher, Karlstadt (DE); Jochen Lehnert, Niederlauer (DE); Rainer Morper, Ramsthal (DE)

(73) Assignee: perma-tec GmbH & Co. KG, Euerdorf (DE)

( * ) Notice: Subject to any disclaimer, the term of this patent is extended or adjusted under 35 U.S.C. 154(b) by 360 days.

(21) Appl. No.: 13/146,778

(22) PCT Filed: Dec. 24, 2009

(86) PCT No.: PCT/EP2009/009279
§ 371 (c)(1),
(2), (4) Date: Aug. 19, 2011

(87) PCT Pub. No.: WO2010/099813
PCT Pub. Date: Sep. 10, 2010

(65) Prior Publication Data
US 2011/0296902 A1 Dec. 8, 2011

(30) Foreign Application Priority Data
Mar. 5, 2009 (DE) .......................... 10 2009 011 373
May 16, 2009 (DE) .......................... 10 2009 021 628

(51) Int. Cl.
*G01N 33/26* (2006.01)
*F16N 11/10* (2006.01)

(52) U.S. Cl.
CPC ............. *F16N 11/10* (2013.01); *F16N 2230/02* (2013.01); *F16N 2250/08* (2013.01)
USPC .............................................. 184/39; 184/7.4

(58) Field of Classification Search
USPC .......................... 184/39, 7.4; 73/53.05; 222/1
See application file for complete search history.

(56) References Cited

U.S. PATENT DOCUMENTS

| | | | | |
|---|---|---|---|---|
| 3,374,158 A | * | 3/1968 | Lord et al. ..................... 205/338 |
| 3,870,616 A | * | 3/1975 | Dempsey et al. ........... 204/228.5 |
| 4,023,648 A | * | 5/1977 | Orlitzky et al. .................. 184/39 |
| 4,671,386 A | * | 6/1987 | Orlitzky ........................... 184/39 |
| 4,744,442 A | * | 5/1988 | Bras et al. ........................ 184/39 |
| 5,012,897 A | * | 5/1991 | Jorissen .......................... 184/39 |
| 5,038,893 A | * | 8/1991 | Willner et al. ................. 184/7.4 |
| 5,404,966 A | * | 4/1995 | Yang ............................... 184/39 |
| 5,460,243 A | * | 10/1995 | Patterson ........................ 184/29 |
| 5,547,043 A | * | 8/1996 | Graf et al. ....................... 184/39 |
| 5,788,012 A | * | 8/1998 | Yang .............................. 184/6.4 |

(Continued)

*Primary Examiner* — William A Rivera
*Assistant Examiner* — Michael Riegelman
(74) *Attorney, Agent, or Firm* — Andrew Wilford

(57) ABSTRACT

The invention relates to a method for metered dispensing of lubricants using a lubricant dispenser comprising a reservoir chamber filled with lubricant, a gas generating unit for electrochemically generating gas, a piston acted on by the generated gas for outputting the lubricant from the reservoir chamber, and an electronic control unit for controlling the electrochemical gas generation. According to the invention, the temperature of the lubricant or the environment is measured at time intervals, and an average temperature value is derived from a plurality of measured temperature values. Using stored correction values describing the temperature-dependence of the electrochemical gas generating rate, a control parameter determining the electrochemical gas generation is set for the average temperature value, having the requirement that the gas generating rate at the average temperature value corresponds to the target value that correlates to prescribed dispensing time.

7 Claims, 2 Drawing Sheets

(56) References Cited

U.S. PATENT DOCUMENTS

| | | | |
|---|---|---|---|
| 5,950,764 A * | 9/1999 | Helbig | 184/105.1 |
| 5,968,325 A * | 10/1999 | Oloman et al. | 204/230.5 |
| 5,992,706 A * | 11/1999 | Patterson et al. | 222/386.5 |
| 6,498,956 B1 * | 12/2002 | Yang | 700/14 |
| 2008/0060879 A1 * | 3/2008 | Orlitzky et al. | 184/39 |
| 2008/0271950 A1 * | 11/2008 | Eisenbacher | 184/7.4 |
| 2008/0271951 A1 * | 11/2008 | Eisenbacher et al. | 184/39 |
| 2011/0315485 A1 * | 12/2011 | Morper et al. | 184/39 |

* cited by examiner

Fig. 1 - Prior art

METHOD FOR METERED DISPENSING OF LUBRICANT

CROSS REFERENCE TO RELATED APPLICATIONS

This application is the US-national stage of PCT application PCT/EP2009/009279 filed 24 Dec. 2009, published 10 Sep. 2010 as WO2010/099813, and claiming the priority of German patent application 102009011373.8 itself filed 5 Mar. 2009 and German patent application 102009021628.6 itself filed 16 Mar. 2009.

FIELD OF THE INVENTION

The invention relates to a method of the metered dispensing of a lubricant, using a lubricant dispenser that has a reservoir filled with lubricant, a gas generator unit to electrochemically produce gas, a piston acted upon by the generated gas to discharge the lubricant from the reservoir, and an electronic controller to control the electrochemical generation of gas.

BACKGROUND OF THE INVENTION

EP 0 806 603 [U.S. Pat. No. 5,788,012] discloses a lubricant dispenser that has these features. A preset value is established for the dispensing time, namely the time to empty the reservoir. From this a microcontroller of the electronic controller calculates the required gas generation rate and controls the gas generator so as to achieve, or at least not to exceed, the set dispensing time for a standard temperature (typically room temperature, that is, approximately 20° C.). No consideration is given to the temperature effect on the gas generation rate and on the volume of lubricant dispensed per unit of time. When the lubricant dispenser is employed outdoors, the dispensing time actually achieved can deviate quite significantly from the preset value as a function of the climate, seasonally fluctuating temperatures, and changes in temperature due to the effects of the weather.

U.S. Pat. No. 5,968,325 describes a lubricant dispenser comprising a gas generator that makes gas spontaneously in a closed circuit without external energy. The gas generation rate, namely the generated gas volume per unit of time, is dependent on the electrical current and can be modified by an electrical resistance. This reference states that gas generation that is less strongly affected by temperature effects can be implemented if the electrical resistance of the gas-generating cell changes as a function of temperature—for which purpose PTC resistors are used whose resistance increases as the temperature rises. However, the compensation of temperature that is possible through the use of a PTC resistor still needs to be improved.

OBJECT OF THE INVENTION

The object of the invention is therefore to provide a method of metered dispensing of a lubricant using a lubricant dispenser comprising the features described above, which method makes possible a discharge of lubricant that is largely independent of temperature effects. No climatic effects or fluctuations in temperature due to the season or weather should influence the discharge of lubricant and the dispensing time actually achieved.

SUMMARY AND SPECIFIC DESCRIPTION OF THE INVENTION

Figure 1:
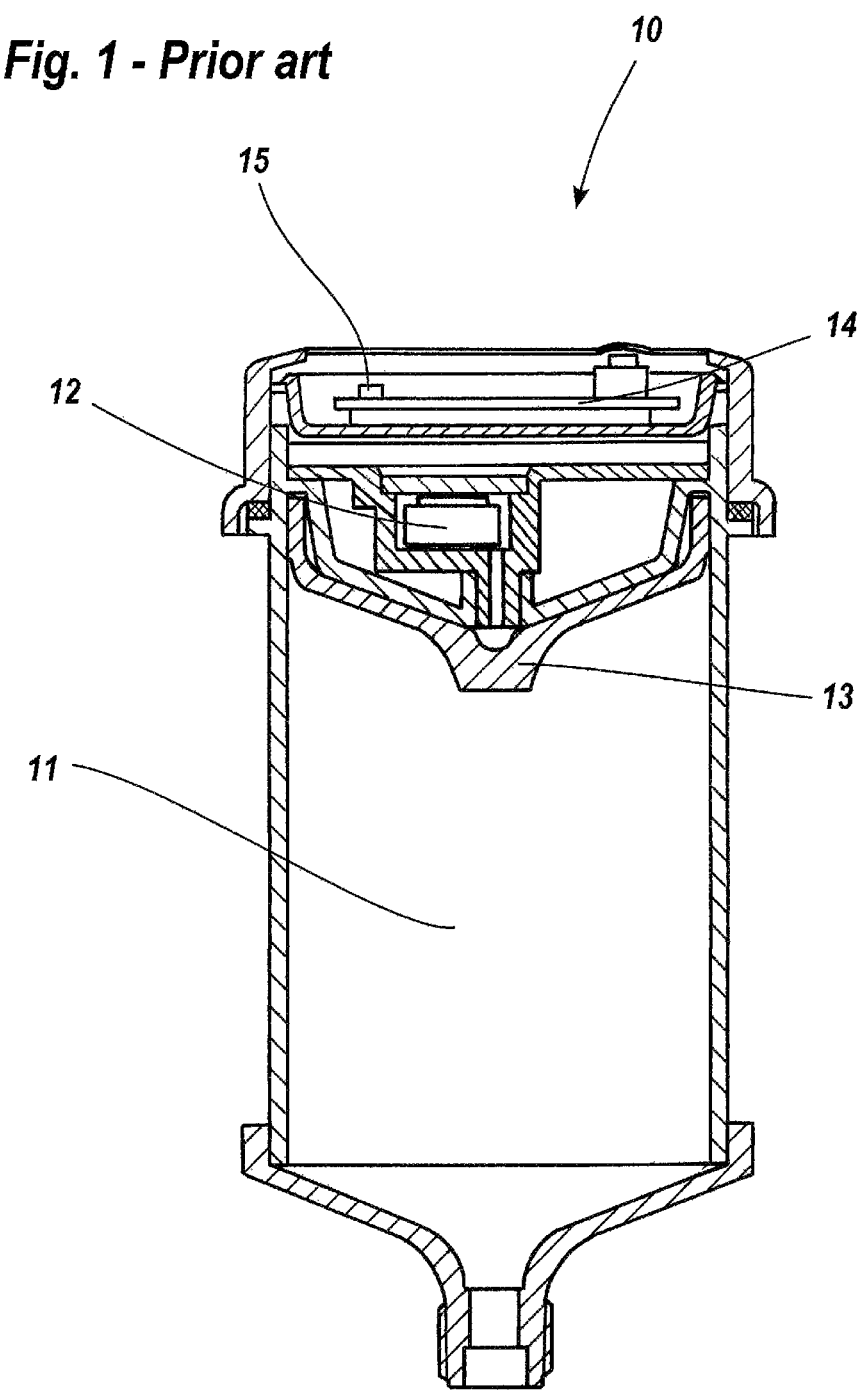
FIG. 1 is a vertical section through a prior-art lubricant dispenser operable according to this invention.
Figure 2:
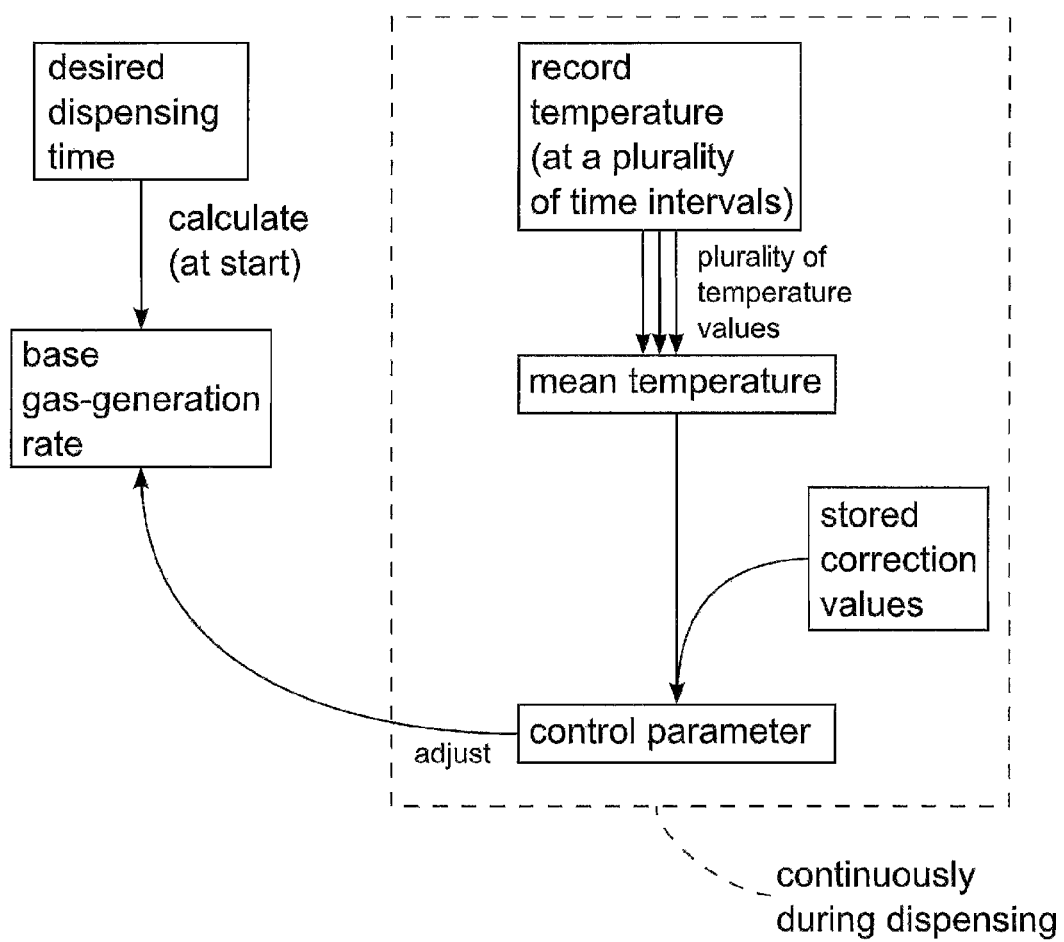
FIG. 2 is a block diagram illustrating the invention.

The method of the instant invention is illustrated as a block diagram in FIG. 2 and is used with a lubricant dispenser 10 as shown in FIG. 1 that has a reservoir 11 filled with lubricant, a gas generator unit 12 to electrochemically produce gas, a piston 13 acted upon by the generated gas to discharge the lubricant from the reservoir 11, and an electronic controller 14 connected to a temperature sensor 15 and to the generator 12 to control the electrochemical generation of gas.

The subject matter of the invention and achievement of this object is a method in which as shown in FIG. 2 a preset value is established for the dispensing time until the reservoir is emptied, and a parameter representing the gas generation rate is computed therefrom. The temperature of the lubricant or the ambient temperature are measured at intervals, and a mean value is computed from a plurality of the measured temperatures. A control parameter determining the electrochemical gas generation is applied to the mean temperature value by taking into account stored correction values that represent the temperature dependence of the electrochemical gas-generation rate such that the gas generation rate for the mean temperature value match the target value calculated from the established dispensing time.

In defining the temperature-dependent correction values, it is optionally also possible to take into account the effect of temperature on the viscosity of the lubricant. As the temperature drops, the viscosity of the lubricant rises significantly to a certain extent. In response to an increase in viscosity, a higher pressure on the rear side of the piston is required in order to ensure a uniform discharge of lubricant. Within the scope of the method according to the invention, it is also possible to define the correction values in such a way that a higher gas generation rate to generate a higher pressure results for lower temperatures, and analogously a lower gas generation rate to reduce the pressure results for higher temperatures.

Within the scope of the method according to the invention, a gas generator can be employed that makes gas spontaneously within a closed circuit without external energy. The gas generator can contain, for example, at least one hydrogen-generating zinc-air cell as the gas generating element.

In a preferred embodiment of the method according to the invention, the temperature is measured multiple times over a predetermined period of time, for example, 24 hours, and a mean temperature value is determined for this time period based on the measured temperature values.

In a preferred embodiment of the method according to the invention, the electrochemical generation of gas is controlled by alternately opening and closing a circuit associated with the gas generator, where the ratio of pulse duration to pause duration is modified so as to correct the gas generation rate. The longer the pulse duration with the circuit closed relative to the pause duration with the circuit open, the higher the mean gas generation rate. Technical implementation can be effected using pulse width modulation, where the duty cycle, that is, the ratio of variable pulse duration to defined cycle duration is used as the control parameter. In a preferred embodiment, however, the pause duration and thus also the cycle duration for the recurring opening and closing of the circuit, are modified for a constant pulse duration.

In addition, it is possible to modify the current in a circuit associated with the gas generator in order to correct the gas generation rate. It is clearly understood that the described measures can also be combined with each other.

The invention claimed is:

1. A method of metered dispensing of a lubricant with a lubricant dispenser having
    a reservoir filled with the lubricant,
    a gas generator for electrochemically generating gas,
    a piston acted upon by the generated gas so as to discharge the lubricant from the reservoir, and
    an electronic controller connected to the gas generator for controlling the electrochemical generation of gas,
the method comprising the steps of:
    defining a preset value for a dispensing time in which the reservoir is to be emptied and calculating therefrom a parameter representing the desired base gas-generation rate;
    measuring a temperature of the lubricant or of the environment multiple times during a predetermined time period;
    calculating a mean temperature value from the measured temperatures values for the time period;
    determining a control parameter determining the electrochemical gas generation for the calculated mean temperature value by taking into account stored correction values that represent a temperature dependence of the gas-generation rate;
    making the gas generation for the calculated mean temperature value correspond to the preset value defined for the specified dispensing time by alternately opening and closing a circuit associated with the gas generator with a succession of pulses separated by pauses; and
    using modulation of pulse duration and pause duration to correct the gas-generation rate by modifying a ratio of pulse duration to pause duration for recurrent opening and closing of the circuit for a constant pulse duration.

2. The method according to claim 1, wherein the gas generator makes gas spontaneously in a closed circuit without external energy.

3. The method according to claim 2, wherein the gas generator contains at least one hydrogen-generating zinc-air cell as a gas-generating element.

4. The method according to claim 1, further comprising the step of:
    taking into account the effect of temperature on the viscosity of the lubricant in defining the temperature-dependent correction values such that, in terms of the target value, a higher gas-generation rate to generate a higher pressure results for lower temperatures and a lower gas-generation rate to reduce the pressure results for higher temperatures.

5. A method of metering a lubricant with a lubricant dispenser having
    a reservoir filled with the lubricant,
    a gas generator for electrochemically producing gas,
    a piston acted upon by the generated gas so as to discharge the lubricant from the reservoir, and
    an electronic controller for controlling the electrochemical generation of gas,
the method comprising the steps of:
    a) calculating for a predetermined desired dispensing time a base gas-generation rate that, once the dispenser is started, will empty the reservoir when or after the dispensing time elapses;
    b) recording after starting of the dispenser at a plurality of separate times during a time period of predetermined length a temperature of the lubricant or of the environment and calculating from the temperatures recorded during the time period a mean temperature for the time period;
    c) determining a gas-generation control parameter from the calculated mean temperature and stored correction values that represent the temperature dependence of the electrochemical gas-generation rate;
    d) adjusting the base gas-generation rate of the dispenser in accordance with the control parameter; and
    e) modifying pulse duration and pause duration to correct the gas-generation rate by varying the pulse duration and pause duration while maintaining the pulse duration constant.

6. The method defined in claim 5 wherein the control parameter affects the base gas-generation rate by increasing gas generation when the calculated mean temperature is below a predetermined level and increasing gas generation when the calculated mean temperature is above a predetermined level.

7. The method defined in claim 5 wherein the step d) is continued for a subsequent time period of the predetermined length during which step b) is repeated, followed by steps c) and d) in subsequent iterations of the method.

* * * * *